United States Patent
Hong et al.

(10) Patent No.: US 11,494,244 B2
(45) Date of Patent: *Nov. 8, 2022

(54) MULTI-WINDOW CONTROL METHOD AND ELECTRONIC DEVICE SUPPORTING THE SAME

(71) Applicant: Samsung Electronics Co., Ltd., Suwon-si (KR)

(72) Inventors: Sun Yeal Hong, Gumi-si (KR); Ji Hun Kim, Seoul (KR); Hye Soon Jeong, Chilgok-gun (KR); Dae Sik Hwang, Daegu (KR); Sung Jun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

This patent is subject to a terminal disclaimer.

(21) Appl. No.: 16/943,280

(22) Filed: Jul. 30, 2020

(65) Prior Publication Data

US 2020/0356427 A1 Nov. 12, 2020

Related U.S. Application Data

(63) Continuation of application No. 15/834,657, filed on Dec. 7, 2017, now Pat. No. 10,754,711, which is a
(Continued)

(30) Foreign Application Priority Data

Jan. 2, 2014 (KR) .................. 10-2014-0000207

(51) Int. Cl.
*G06F 3/04886* (2022.01)
*G06F 9/54* (2006.01)

(52) U.S. Cl.
CPC .......... *G06F 9/542* (2013.01); *G06F 3/04886* (2013.01); *G06F 2203/04803* (2013.01)

(58) Field of Classification Search
CPC ............... G06F 9/542; G06F 3/04886; G06F 2203/04803
See application file for complete search history.

(56) References Cited

U.S. PATENT DOCUMENTS

| 5,075,675 A | 12/1991 | Barker et al. |
| 5,666,555 A * | 9/1997 | Okazaki ................ H04N 5/45 715/203 |

(Continued)

FOREIGN PATENT DOCUMENTS

| JP | 2010-277594 A | 12/2010 |
| JP | 4982505 B2 | 7/2012 |

(Continued)

OTHER PUBLICATIONS

Korean Office Action dated May 21, 2020, issued in Korean Patent Application No. 10-2014-0000207.
(Continued)

*Primary Examiner* — Dino Kujundzic
(74) *Attorney, Agent, or Firm* — Jefferson IP Law, LLP

(57) ABSTRACT

A multi-window control method and an electronic device supporting the same is provided. The multi-window control method includes changing a size of at least one specific window among a plurality of windows, and altering a focus to the at least one specific window based on a changed size of the at least one specific window.

18 Claims, 8 Drawing Sheets

Related U.S. Application Data continuation of application No. 14/587,486, filed on Dec. 31, 2014, now Pat. No. 9,891,965.

(56) References Cited

U.S. PATENT DOCUMENTS

| | | | |
|---|---|---|---|
| 5,682,166 A * | 10/1997 | Takahashi | G06F 3/0481 340/4.13 |
| 5,703,794 A * | 12/1997 | Heddle | G06F 3/165 370/522 |
| 5,771,042 A | 6/1998 | Santos-Gomez | |
| 6,008,809 A | 12/1999 | Brooks | |
| 6,040,831 A * | 3/2000 | Nishida | H04N 5/60 348/E5.122 |
| 6,081,266 A * | 6/2000 | Sciammarella | G06F 3/165 715/727 |
| 6,166,736 A | 12/2000 | Hugh | |
| 6,414,698 B1 | 7/2002 | Lovell et al. | |
| 6,600,500 B1 * | 7/2003 | Yamamoto | G06F 3/0481 715/779 |
| 6,609,146 B1 | 8/2003 | Slotznick | |
| 6,639,606 B1 | 10/2003 | Choi | |
| 6,961,906 B2 | 11/2005 | Hansen et al. | |
| 7,694,233 B1 | 4/2010 | Ording | |
| 8,302,026 B2 | 10/2012 | Wang et al. | |
| 8,549,429 B2 | 10/2013 | Tsuruta et al. | |
| 8,689,135 B2 | 4/2014 | Portele et al. | |
| 2003/0090521 A1 | 5/2003 | Hansen et al. | |
| 2005/0108655 A1 | 5/2005 | Andrea et al. | |
| 2006/0005146 A1 | 1/2006 | Arcas | |
| 2006/0015820 A1 | 1/2006 | Wood | |
| 2006/0036962 A1 | 2/2006 | Jobs et al. | |
| 2007/0192730 A1 | 8/2007 | Simila et al. | |
| 2008/0052637 A1 | 2/2008 | Ben-Yoseph et al. | |
| 2008/0177522 A1 | 7/2008 | Bolding et al. | |
| 2008/0288876 A1 * | 11/2008 | Fleming | G06F 3/167 715/761 |
| 2009/0136060 A1 * | 5/2009 | Mishima | H04N 5/45 381/105 |
| 2010/0088634 A1 | 4/2010 | Tsuruta et al. | |
| 2010/0138767 A1 | 6/2010 | Wang et al. | |
| 2010/0293468 A1 * | 11/2010 | Thijssen | G06F 3/165 715/727 |
| 2011/0035703 A1 * | 2/2011 | Negishi | G06F 3/165 715/802 |
| 2013/0063668 A1 * | 3/2013 | Yamashita | H04N 21/440263 348/E5.122 |
| 2013/0159941 A1 | 6/2013 | Langlois et al. | |
| 2013/0167027 A1 * | 6/2013 | Adolph | G06F 3/0482 715/716 |
| 2014/0089833 A1 | 3/2014 | Hwang et al. | |
| 2014/0258916 A1 | 9/2014 | Laycock et al. | |
| 2014/0365888 A1 * | 12/2014 | Curzon | G06F 3/0485 715/716 |
| 2015/0286344 A1 | 10/2015 | Kaufthal et al. | |
| 2016/0147496 A1 * | 5/2016 | Lee | H04N 5/45 345/1.3 |
| 2017/0192741 A1 * | 7/2017 | Liu | G06F 3/165 |
| 2020/0186926 A1 * | 6/2020 | Park | H04M 1/725 |

FOREIGN PATENT DOCUMENTS

| | | |
|---|---|---|
| KR | 10-2013-0054072 A | 5/2013 |
| KR | 10-2014-0102569 A | 8/2014 |
| KR | 10-2014-0136794 A | 12/2014 |

OTHER PUBLICATIONS

Microsoft Press, "Microsoft Computer Dictionary," Mar. 2002, Microsoft Press, 5th Edition, Definition for "opacity." (Year: 2002).

* cited by examiner

MULTI-WINDOW CONTROL METHOD AND ELECTRONIC DEVICE SUPPORTING THE SAME

CROSS-REFERENCE TO RELATED APPLICATION(S)

This application is a continuation application of prior application Ser. No. 15/834,657, filed on Dec. 7, 2017, which is a continuation application of prior application Ser. No. 14/587,486, filed on Dec. 31, 2014, which has issued as U.S. Pat. No. 9,891,965 on Feb. 13, 2018 and was based on and claimed the benefit under 35 U.S.C. § 119(a) of a Korean patent application filed on Jan. 2, 2014 in the Korean Intellectual Property Office and assigned Serial number 10-2014-0000207, the entire disclosure of which is hereby incorporated by reference.

TECHNICAL FIELD

The present disclosure relates to a multi-window control of an electronic device.

BACKGROUND

With recent developments in digital technology, electronic devices available for communication and personal data processing on the move, such as mobile communication terminals, Personal Digital Assistants (PDAs), electronic organizers, smart phones, and tablet Personal Computers (PCs), are being diversely released. Such electronic devices do not stay in their own traditional specific areas and attain a mobile convergence stage in which they embrace the functional areas of other terminals.

An electronic device provides a screen corresponding to function performance in a window type. The electronic device may display each window in correspondence to a plurality of function performances.

However, an existing electronic device is being designed to output a plurality of windows at a predefined position on a display unit. Accordingly, in an environment where the windows operate, a user inconveniently has to adjust a size and position of each window in order to confirm proper information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a multi-window control method and an electronic device supporting the same that minimize resizing windows by a user and support to enable simple use of a plurality of windows by adaptively controlling a display scheme of the plurality of windows.

In accordance with an aspect of the present disclosure, a multi-window control method is provided. The multi-window control method includes changing a size of at least one specific window among a plurality of windows, and altering a focus to the at least one specific window based on a changed size of the at least one specific window.

In accordance with another aspect of the present disclosure, an electronic device supporting a multi-window control is provided. The electronic device includes a display module displaying a plurality of windows and a control module changing a size of at least one specific window among a plurality of windows and, to alter a focus to the at least one specific window based on a changed size of the at least one specific window.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
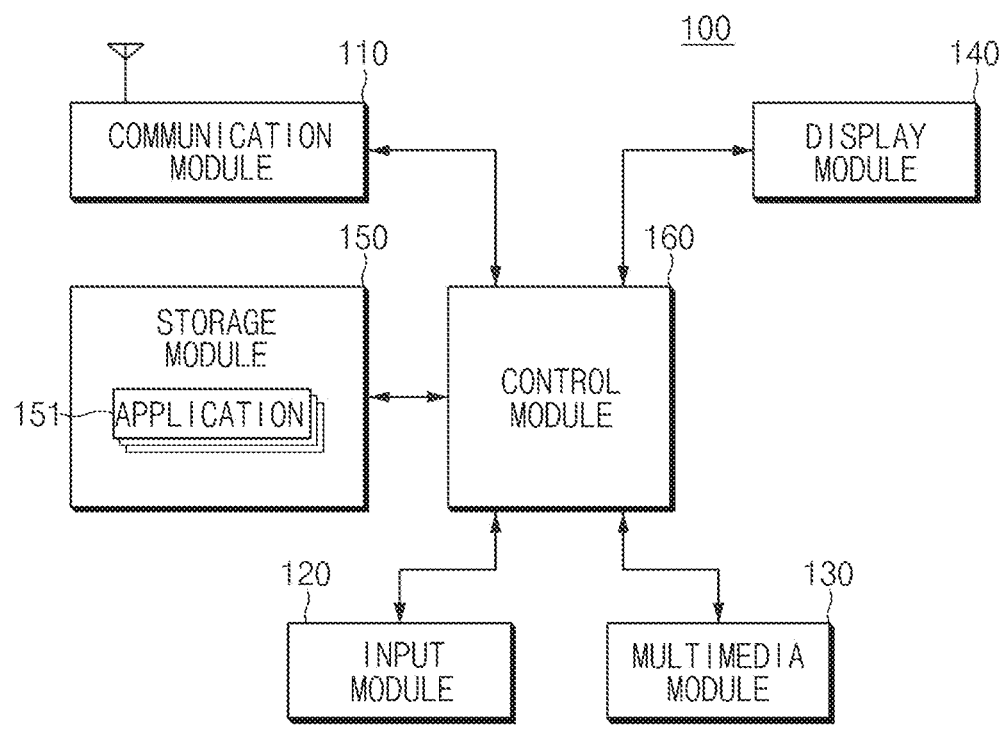
FIG. 1 illustrates an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The expression "or" or "at least one of A or/and B" used herein includes any and all combinations of enumerated words. For example, "A or B" or "at least one of A or/and B" may each include A, B, or both A and B.

It will be understood that, although the terms first, second, and the like, may be used herein to describe various elements, these elements should not be limited by these terms. For example, these terms do not limit sequence and/or importance of corresponding elements. These terms are only used to distinguish one element from another. For example, a first user device and a second user device are all but different user devices. For example, a first element could be termed a second element, and, similarly, a second element could be termed a first element, without departing from the scope of example embodiments.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. It is to be understood that the singular forms "a," "an," and "the" include plural referents unless the context clearly dictates otherwise.

Unless otherwise defined, all terms used herein have the same meaning as commonly understood by one of ordinary skill in the art to which this present disclosure pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

An electronic device according to the present disclosure may be a device including information displaying function. For example, the electronic device may include at least one selected from a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, mobile medical equipment, a camera, or a wearable device (for example, glasses such as a Head-Mounted-Device (HMD), electronic clothes, electronic bracelet, electronic collar, appcessory, electronic tattoo, or smart watch).

According to some embodiments, an electronic device may be a smart home appliance having information displaying functions. The smart home appliance may include at least one selected from, for example, a TV, DVD player, audio, refrigerator, air conditioner, cleaner, oven, microwave oven, washing machine, air cleaner, set-top box, TV box (e.g., Samsung HomeSync™, Apple TV™, or Google TV™), game console, electronic dictionary, electronic key, camcorder, and electronic picture frame.

According to some embodiments, an electronic device may include at least one selected from various medical devices (e.g., Magnetic Resonance Angiography (MRA), Magnetic Resonance Imaging (MRI), Computed Tomography (CT), camcorder, ultrasound imaging, and the like), a navigation (navigation) device, a Global Positioning System (GPS) receiver, an Event Data Recorder (EDR), a Flight Data Recorder (FDR), an automotive infotainment device, marine electronic equipment (such as a gyro compass and marine navigation system, and the like), avionics, security equipment, an automotive head unit, an industrial or domestic robot, an Automatic Teller Machine (ATM) in a financial institution, and Point Of Sales (POS) in a shop.

According to some embodiments, an electronic device may include at least one selected from furniture or building/structure including information displaying function, an electronic board, an electronic signature receiving device, a projector, or other measuring instruments (such as a water meter, electricity meter, gas meter, or wave measurement device, and the like). An electronic device according to the present disclosure may be a combination of one or more of the above-described various electronic devices. In addition, an electronic device may be a flexible device. Furthermore, it may be obvious to those skilled in the art that an electronic device according to the embodiments is not limited to the above-described devices.

Hereinafter, electronic devices according to various embodiments will be described with reference to the accompanying drawings. The term "user" used herein may refer to a person who uses an electronic device or may refer to a device (e.g., an artificial intelligence electronic device) that uses an electronic device.

In addition, window described hereinafter may be a certain area where information according to function execution is output in an electronic device. For example, the information may include various screen elements related to function execution. For example, the information may include at least one selected from various items including a text, a still image or a video, an icon, a virtual key button, a slide bar, a progress bar, a list item, or a thumbnail item. In various embodiments, the window may output in a new layer type on a background screen. Multi-window may be generated by dividing a top layer area of the background screen and outputting a plurality of windows on the divided layer areas. Alternatively, the multi-window may be generated by pushing up or adjusting in a certain size some area of a single window in a state where the single window is output.

According to various embodiments, the window may be generated by updating a certain area of the background screen in order to display new information. For example, the electronic device may generate multi-window by deleting information displayed on certain areas of the background image and displaying information according to execution of a specific function on the corresponding areas or overwriting information according to function execution on the certain areas. The multi-window may be generated by dividing the background screen into a plurality of areas and displaying or overwriting information according to execution of a plurality of functions on the divided areas.

As described above, a multi-window control method and an electronic device supporting the same described in various embodiments of the present disclosure are to indicate, with a window, an area on which information according to execution of a specific function is displayed in the electronic device, and the area is not limited to a name "window" described herein. Accordingly, the window will be understood with various terms including an information display area, an information display layer, a popup window, a player, or a screen according to function execution.

FIG. 1 illustrates an electronic device according to an embodiment of the present disclosure.

Referring to FIG. 1, an electronic device 100 may include a communication module 110, an input module 120, a multimedia module 130, a display module 140, a storage module 150, and a control module 160, but is not limited thereto.

According to various embodiments, the electronic device 100 may automatically change window focus (or window selection) related to function processing of a specific window, if a size or position of a specific window is changed in a multi-window output environment. A window focus state may include at least one selected from an input event reception standby state related to a corresponding window, an image signal output related to the corresponding window, an audio signal output related to the corresponding window, activation of a communication unit related to the corresponding window, and application of screen effect related to the corresponding window.

According to various embodiments, the electronic device 100 may adjust the window focus if window switching in which a specific window position is exchanged with another window position occurs. According to various embodiments, the electronic device 100 may resize the multi-window when an event occurs which is related to a virtual handler presented in the display module 140 in relation to resizing the multi-window. In this process, the electronic device may automatically adjust window focus in correspondence to the resized multi-window.

The multi-window may have an identical structure or different structures according to a kind of an executed program in various embodiments. For example, windows may have different template structures for each program type such as an application or widget. Alternatively, a size of an area in a window, arrangement or disposition of a plurality of areas, the number of areas, and a shape or the number of virtual key buttons included at least one area may be differently, similarly, or identically defined for each program.

A multi-window environment may have a type where at least two among a plurality of windows are respectively disposed on divided screen areas in an embodiment. The plurality of windows may be mutually resized in correspondence to adjustment of a handler (or virtual handler). For example, the handler may be disposed between the first and second windows in a state where the first and second windows are disposed on the display module 140. For example, if a first window is resized in correspondence to a handler manipulation event, a second window may be resized to offset the size of the first window.

The communication module 110 may include at least one communication unit related to a communication function. For example, the communication module 110 may include various communication units such as a mobile communication unit, a broadcast unit including a Digital Multimedia Broadcasting (DMB) module or Digital Video Broadcasting-Handheld (DVB-H) module, a short range communication unit including a Bluetooth module, or a Near Field Communication (NFC) module, or a Wireless Fidelity (Wi-Fi) communication unit. In correspondence to operation of the communication module 110, the electronic device 100 may output a specific window on the display module 140. For example, the electronic device 100 may output, on the display module 140, a call function related window in relation to support of a voice call function. According to various embodiments, the electronic device 100 may output, on the display module 140, a web browser window related to support of a web access function of the communication module 110, a broadcast screen window related to a broadcast receiving function of the communication module 110, an image window according to streaming data reception of the communication module 110 or a screen window according to formation of a short range communication channel. The communication module 110 may receive data related to the above-described windows from another electronic device or a sever device and provide the received data to the control module 160.

When functions based on the communication module 110 are compositely executed, the electronic device 100 may output a plurality of windows on the display module 140. When the plurality of windows are output based on the communication module 110, the electronic device 100 may adjust a size and position of a window corresponding to each of the functions. For example, the electronic device 100 may output, on the display module 140, identical size windows executed based on the communication module 110. The control module 160 of the electronic device 100 may perform a focusing process for a specific window selected by a user or selected lately according to an execution sequence. If the specific window is focused, a signal processing related to the communication module corresponding to the focused window may be performed.

According to an embodiment, the electronic device 100 may output a first window related to a broadcast reception function and a second window related to streaming service. For example, if the first window is focused, the control module 160 may control the broadcast receiving unit to output received video signal and received audio signal. In this process, the control module 160 may limit an output of the video and audio signals received by the short range communication unit in relation to the streaming service. For example, the control module 160 may output the video signal received by the short range communication unit and limit an output of the audio signal. Alternatively, the control module 160 may control a deactivation of the short range communication unit, and to output a certain video signal received by the short range communication unit to the second window before the deactivation.

The input module 120 may generate an input signal of the electronic device 100. The input module 120 may include, for example, at least one selected from a key pad, a dome switch, a touch pad (static pressure/capacitive), a jog wheel, and a jog switch. The input module 120 may be implemented in a button type outside the electronic device 100 or some of the buttons may be implemented with the touch panel. According to an embodiment, the input module 120 may include a plurality of keys for receiving numeral or character information and setting various functions. Such keys may include a menu call key, a screen on/off key, a power on/off key, a volume control key, and a home key.

The input module 120 may generate an input signal for requesting activation of at least one application 151 stored in the storage module 150, an input signal related to handler manipulation in a state where the handler or multi-window are output on the display module 140, or an input signal for requesting switching control between windows. The input module 120 may include an input signal for requesting removal of a specific window in a state where the multi-widow is output, or an additional input signal for additionally requesting an output of a new window. The additional input signal may be a signal related to a request for activation of a new application 151. The input module 120 may deliver the generated input signal to the control module 160.

The multimedia module 130 may process an audio signal of the electronic device 100. For example, the multimedia module 130 may transmit the audio signal received from the control module 160 to a speaker SPK. The multimedia module 130 may deliver an audio signal such as a voice received from a microphone MIC to the control module 160. The multimedia module 130 may convert the audio signal such as the voice received from the microphone into a digital signal and deliver the digital signal to the control module 160.

According to an embodiment, the multimedia module 130 may output an audio signal related to a specific window in an environment where multi-window is output on the display module 140. Here, the multimedia module 130 may output an audio signal of a focused specific window among the multi-window. If the window focus is changed to another window, the multimedia module 130 may output an audio signal related to the changed window.

According to various embodiments, when an operation related to handler manipulation or window switching occurs in the multi-window output environment, the multimedia module 130 may output a corresponding sound announcement or sound effect. In addition, when a new window is additionally output in the multi-window environment, the multimedia module 130 may automatically output an audio signal related to the newly output window. Alternatively, the multimedia module 130 may output an audio signal related to a window resized greater than a designated size through handler manipulation. An audio signal output scheme for the plurality of windows being output on the display module 140 may be adjusted according to a designer's scheme or user setting, or an audio signal output may be omitted.

The display module 140 may display (or output) at least one of various windows corresponding to functions processed by the electronic device 100. For example, if the electronic device 100 is in a voice call mode, a User Interface (UI) or Graphic User Interface (GUI) related to the voice call is displayed in a window type. In addition, if the electronic device 100 is in a video call mode or a capturing mode, the display module 140 displays captured or/and received images, UI, or GUI in a window type. According to an embodiment, the display module 140 displays application windows for various functions (or applications, or programs) executed in the electronic device 100. Furthermore, the display module 140 activates and displays a virtual input device (for example, a virtual touch pad) according to a control by the control module 160 in the application window, and deliver a signal input though the virtual input device to the control module 160.

According to an embodiment, the display module 140 may output at least one application window in correspondence to the at least one application 151. The application window may be a screen element corresponding to activation of a program prepared in relation to support of a specific function. For example, the application window may be a call function related window according to execution of a call function. The application window may include various windows such as a video related window, a broadcast reception related window, a file editing function related window, a gallery function related window, or a message writing function window.

According to various embodiments, the application widow may be resized in correspondence to an event related to handler manipulation. For example, if a first function application window is resized according to the handler manipulation in a state where the first function application window and a second function application window are output, the second function application window may be resized in correspondence to the size of the first function application window. According to an embodiment, the display module 140 may display the second function application window having the size reduced as much as the size of the first function application window is increased. In this process, the display module 140 may change quantity or size of information displayed on the first or second application window.

In the above-described description, the first and second functions may be specific program related functions or specific widget related functions supported in the electronic device 100. For example, the first and second functions may be various functions such as a camera related function, memo function, document editing function, searching function, image playback function, and chatting function, and the like. In the multi-window environment, if a window related to the first function is resized to a certain size or greater, the focus related to the window may be changed. The display module 140 may provide a specific display effect on a focused window according to a control by the control module 160. For example, the focused window may be emphasized (e.g., highlighted). The display module 140 may provide the specific display effect to a window that is not focused or having a certain size or smaller according to a control by the control module 160. For example, the window that is not focused or having the certain size or smaller may be dimmed or color or brightness thereof may become darkened.

The display module 140 may support a screen display in a landscape mode according to a rotation direction (or laid direction), a screen display in a portrait mode, and a screen conversion display according to a change between the landscape and portrait modes. If the landscape or portrait mode change occurs in the multi-window environment, the display module 140 may correspondingly change a disposition type or a display type of windows. In addition, if the window switching occurs which corresponds to a position change between windows in the multi-window environment, the display module 140 may perform a menu arrangement that changes a menu's position. For example, the display module 140 may perform menu arrangement including a handler around a handler axis.

The display module 140 may include at least one of selected from a Liquid Crystal Display (LCD), a Thin Film Transistor-LCD (TFT-LCD), a Light Emitting Diode (LED), an Organic LED (OLED), Active Matrix OLED (AMO-LED), a flexible display, a bended display, and a 3D display. Some displays among them may be implemented with a transparent display configured in a transparent or optically transparent type in order to be seen from outside.

In addition, the display module 140 may have a touch screen including a touch panel and also be used as an input device. The touch panel may perform to convert pressure applied to a specific portion of the display module 140 or a capacitive change occurring at a specific portion of the display module 140 into an electrical input signal. The touch panel may perform to detect not only a touched position or area but also pressure at the time of being touched. The touch panel may be placed on the display unit. The touch panel may be implemented in an add-on type located on the display unit, or in an on-cell type or in-cell type inserted into the display unit. The touch panel delivers a user input in response to a user's gesture for the display module 140 to the control module 160. Here, the user input occurring with a touch unit such as a finger or touch pen may include a touch, a multi-touch, a tap, a double-tap, a long tap, a tap & touch, a drag, a flick, a press, a pinch-in, and a pinch-out. The above-described user input may be defined and used as a touch input for requesting a multi-window output, a touch input related to handler manipulation in a multi-window output state, or a touch input related to window switching.

The storage module 150 may store an application 151 for processing and controlling the control module 160.

The application 151 may include program routines supporting various functions supported by the electronic device 100. For example, the application 151 may include various apps including an application supporting music playback, an application supporting video playback, a file editing function application, a camera function application, a chatting function application, a game function application, a gallery function application, a calculator application, a voice search application, a map application, or a weather application. The application 151 may be activated in response to an execution request and output a screen corresponding thereto in a window type to the display module 140. The application 151 may be provided as a menu item, or in an icon type on a standby screen or menu screen. Here, the icon may have a certain size or various sizes according to a design type.

The storage module 150 may include at least one type of storage medium including a memory such as a flash memory type, hard disk type, micro type, and card type (e.g., Secure Digital (SD) card or eXtreme Digital (XD) card), and a memory such as a Random Access Memory (RAM), a Static RAM (SRAM), Read Only Memory (ROM), Programmable ROM (PROM), Electrically Erasable PROM (EEPROM), Magnetic RAM (MRAM), magnetic disk, and optical disk type.

The control module 160 may support an output of a standby screen or a menu screen related to at least one application 151 stored in the storage module 150. The control module 160 may output at least one window in correspondence to selection of at least one specific application 151 from the standby screen or the menu screen. For example, the control module 160 may output an application window in correspondence to the selection of the application 151. The control module 160 may support a multi-window environment, for example, an output environment of a plurality of application windows. According to an embodiment, the control module 160 may include a configuration shown in FIG. 2 in relation to focusing and window switching processes according to resizing of a specific window in a multi-window environment.

Furthermore, various embodiments described herein may be implemented in a computer or similar device readable recording medium by using software, hardware, or a combination thereof. According to hardware implementation, embodiments may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and other electrical units for function performance. In some cases, embodiments described herein may be implemented with the control module 160 itself. According to software implementation, embodiments such as procedures and functions described herein may be implemented with software modules. Each of the software modules may perform at least one function and operation described herein.

Figure 2:
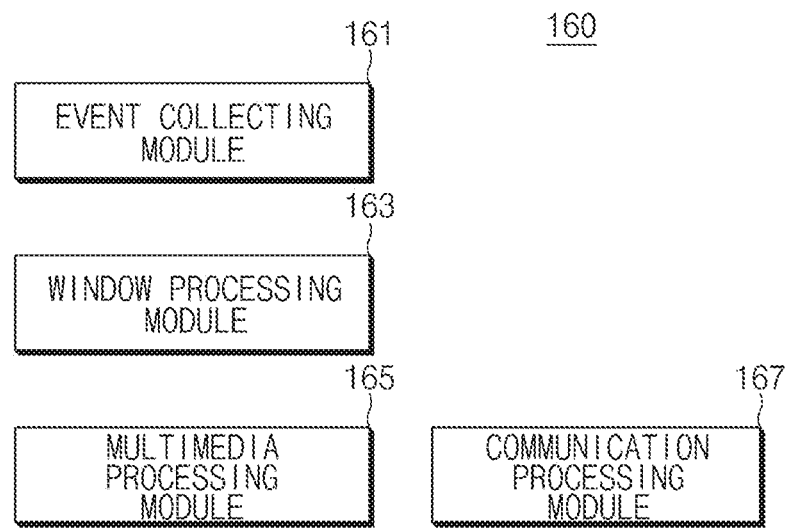
FIG. 2 illustrates a configuration of a control module explained in various embodiments of the present disclosure.

FIG. 2 illustrated a configuration of a control module explained in various embodiments of the present disclosure.

Referring to FIG. 2, the control module 160 may include an event collecting module 161, a window processing module 163, a multimedia processing module 165, and a communication processing module 167, but is not limited thereto.

The event collecting module 161 may collect events occurring in the electronic device 100. For example, the event collecting module 161 may collect input signals occurring in the input module 120 as events. The event collecting module 161 may control power supplying to the touch panel in relation to input function support of the display module 140. The event collecting module 161 may collect touch events occurring in the display module 130 having the input function. If the electronic device 100 supports speech recognition and command function, the event collecting module 161 may accordingly activate the microphone and collect speech recognition event. If the electronic device provides various sensors, the event collecting module 161 may collect sensor information corresponding to a gesture as an event. For example, the event collecting module 161 may collect as an event at least one piece of sensing information such as acceleration sensing information, geo-magnetic sensing information, contact or pressure sensing information which occurs in at least one sensor. The events collected by the event collecting module 161 may provide to the window processing module 163.

According to an embodiment, the event collecting module 161 may collect touch events in relation to handler manipulation in a state where multi-window and handler are output. The event collecting module 161 may collect touch events instructing a position change between a specific window and another window in an environment where the multi-windows are disposed. The event collecting module 161 may collect touch events occurring on the focused window.

The window processing module 163 may be a module supporting a function process of each window. The window processing module 163 may process a function related to a specific window according to an event provided by the event collecting module 161. For example, if receiving an event for requesting execution of a first function from the event collecting module 161, the window processing module 163 may allocate a processor (or a system resource) to a first function process. In addition, if receiving an event for requesting execution of a second function from the event collecting module 161 in a state where the first function is being executed, the window processing module 163 may allocate a processor for the second function process. The window processing module 163 may deliver a specific event received from the event collecting module 161 to the processor related to the first function process or the process related to the second function process. Then the processor related to the first function process may perform the first function in correspondence to the delivered event. In addition, the processor related to the second function process may perform the second function corresponding to the delivered event.

According to an embodiment, the window processing module 163 may output a handler if receiving a request for an output of the multi-window. The handler may be disposed at least one point on a boundary area of the multi-window.

The window processing module 163 may receive a touch event related to the handler manipulation from the event collecting module 161. The window processing module 163 may resize the multi-window in correspondence to a touch event in relation to the handler manipulation. If a size of a specific window is not smaller than a certain size in the resizing process of the multi-window, the window processing module 163 may control so that the corresponding window is focused. If the size of the specific window is not greater than the certain size in the resizing process of the multi-window, the window processing module 163 may control so that the corresponding window is deactivated. According to an embodiment, the window processing module 163 may invalidate or neglect a touch event occurred on the deactivated window.

The window processing module 163 may receive a touch event related to position adjustment of the specific window, for example, a switching event, from the event collecting module 161. The window processing module 163 may adjust disposition positions between specific windows in correspondence to the window switching event.

The multimedia processing module 165 may receive window focusing information from the window processing module 163. The multimedia processing module 165 may confirm which window is focused by confirming the window focusing information. The multimedia processing module 165 may confirm whether there is an audio signal to be output in relation to the focused window. If there is the audio signal related to the focused widow, the multimedia processing module 165 may control so that the corresponding audio signal is to be output therethrough. If there is an audio signal related to a previously focused window, the multimedia processing module 165 may limit an output of the corresponding audio signal. According to various embodiments, if there is not an audio signal related to the focused window, the multimedia processing module 165 may control so that the audio signal of the previously focused window is output.

The communication processing module 167 may receive window focusing information from the window processing module 163. The communication processing module 167 may confirm whether there is a communication function related to the focused window by confirming the window focusing information. If there is the communication function related to the focused window, the communication processing module 167 may support the corresponding communication function. For example, a window focus related to a short range communication function may be changed into the window focus related to a broadcast reception function. In this case, the communication processing module 167 may control so that a short range communication unit related to the short range communication function is transitioned to a standby state or be deactivated. The communication processing module 167 may activate a broadcast reception unit related to the broadcast reception function.

According to various embodiments, the communication processing module 167 may release, create or reconnect a communication channel according to whether a focus is performed in relation to a web access function. For example, if a corresponding web access function window is focused in relation to the web access function, the communication processing module 167 may create or reconnect a communication channel with a specific server device. In addition, if the focus of the web access function window is released, the communication processing module 167 may release the communication channel.

As described above, the electronic device 100 according to various embodiments may support to adjust a window focused if resizing a specific window in the multi-window environment. Accordingly, the electronic device according to an embodiment may provide continuity of a job by continuously manipulating the window together with the resizing of the window. In addition, the electronic device 100 according to an embodiment may automatically change an audio source according to resizing of the window. Furthermore, the electronic device 100 may automatically adjust a state such as activation, deactivation, standby or connection of the communication module according to the resizing of the window.

According to various embodiments, the electronic device 100 in an embodiment may include the display module 140 displaying a plurality of windows and the control module 160 alter a focus that performs a function process related to a specific window, if a size of the specific window is extended greater than a specified size, while resizing the specific window among the plurality of windows in correspondence to event occurrence.

According to various embodiments, the control module 160 may reduce sizes of other windows in correspondence to the size extension of the specific window, and release the altering a focus if the sizes of the other windows are reduced to a specified size or smaller.

According to various embodiments, if the sizes of the other windows are reduced to the specified size or smaller, the control module 160 may transit, an input state related to the windows whose size is reduced to a deactivation state.

According to various embodiments, if the sizes of the other windows are reduced to the specified size or smaller, the display module 140 may change and display displaying effects of the windows whose sizes are reduced According to various embodiments, if an event related to the size-reduced windows is received, the control module 160 may extend a size of a window designated by the window related event to a specified size and alter a focus to the designated window.

According to various embodiments, the display module 140 may output a handler controlling the resizing of the windows to a boundary area where the plurality of windows are disposed.

According to various embodiments, the control module 160 may resize the plurality of windows to a size of a certain predefined ratio in correspondence to a touch event of the handler and maintain focus to the specific window.

According to various embodiments, the control module 160 may extend a size-reduced window in correspondence to a movement event of the handler and, if the size of the extended window is not smaller than a specified size, change the focus to the extended window.

According to various embodiments, the display module 140 may control to output guiding information that instructs a specified size of the window that satisfies the focus alteration.

According to various embodiments, the display module 140 may dispose a menu item related to the specific window at an area adjacent to the boundary area of the windows and display the menu item on the area adjacent to the boundary area of the windows while moving the specific window to a position where another window has been disposed.

Figure 3:
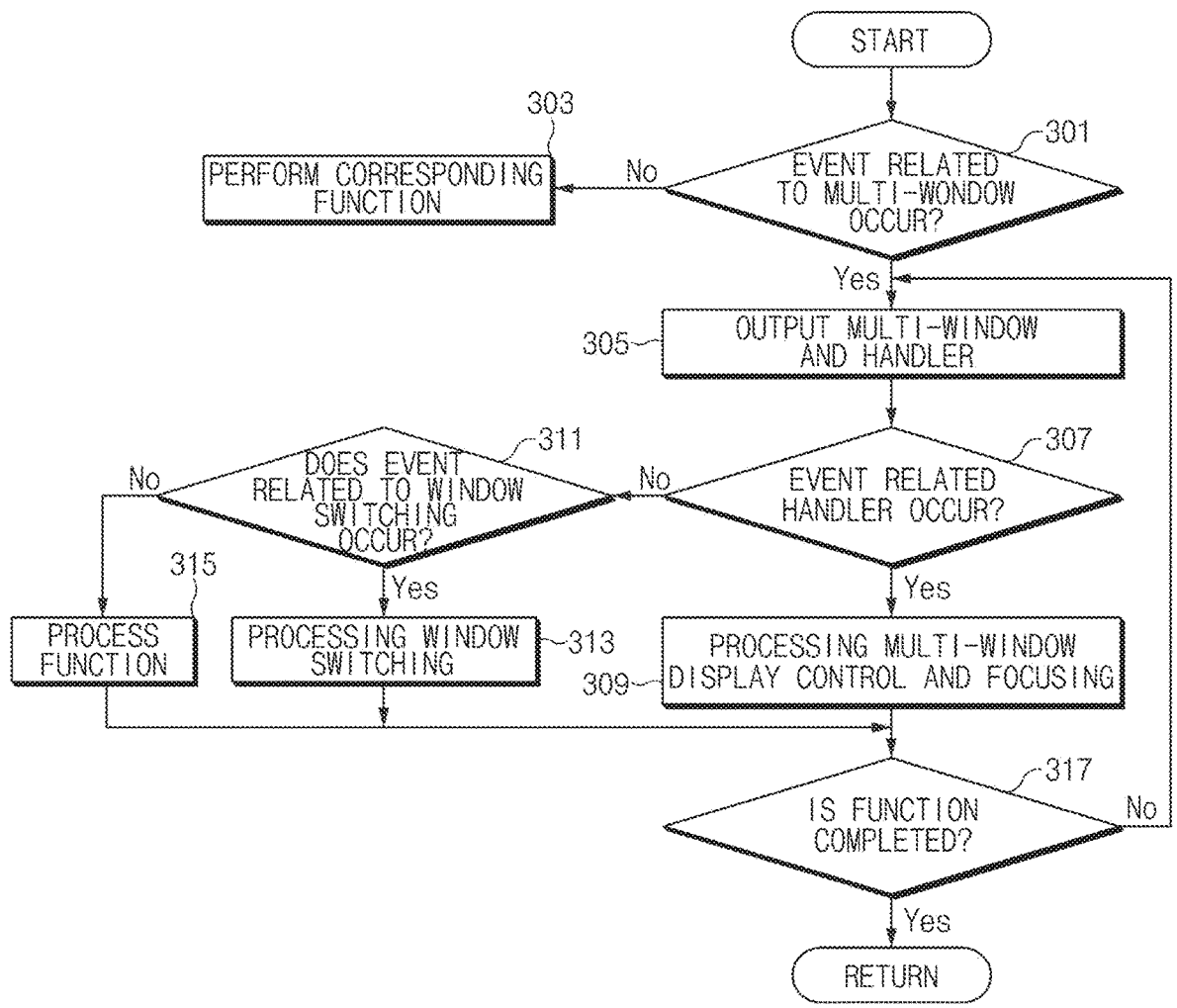
FIG. 3 illustrates a multi-window control method of an electronic device according to an embodiment of the present disclosure.

FIG. 3 illustrates a multi-window control method of an electronic device according to an embodiment of the present disclosure.

Referring to FIG. 3, according to an embodiment, when a specific event occurs, in operation 301, the control module 160 may confirm whether the corresponding event is a multi-window related event (for example, the multi-window event may be event to output plural windows on the display module). When the event occurred in operation 301 is not the multi-window related event, the control module 160 may proceed to operation 303 and support function performance according to a kind and characteristics of the corresponding event. For example, the control module 160 may output a window according to the specific function performance on the display module 140. Alternatively, the control module 160 may output an audio signal according to playback of a specific sound source or support a specific communication function performance.

When the multimedia related event is confirmed to occur in operation 301, the control 160 may perform a multi-window or handler output in operation 305. The multi-window related event may be an event requesting a multi-window output from the display module 140. For example, when an event occurs which selects an icon or a menu item set to simultaneously execute a plurality of apps, the display module 140 may output multi-window. Alternatively, when an application execution request is additionally occurs in a state where one window according to a specific application execution is output, multi-window may be output on the display module 140. Here, the multi-window may be two or more windows. The handler may be disposed at least one point among corners or edges of windows included in the multi-window. According to an embodiment, the handler may be disposed at least one point among edge points at which three or more windows face each other. When the three or more windows face each other, the handler may be disposed at a position at which three or more windows face each other, for example, a specific corner point. The handler may support a function process related to resizing of the multi-window. If the handler moves to a certain point, the multi-window may be resized around the moved point of the handler.

In operation 307, the control module 160 may confirm whether a handler related event occurs. For example, the control module 160 may confirm whether a touch event occurs at a position where the handler is output on the touch panel. Alternatively, the control module 160 may confirm whether an input event occurs from a key button or a key map related to the handler manipulation or other various input units.

When the handler related event occurs in operation 307, the control module 160 may perform a multi-window display control and focusing process in operation 309. In this process, the control module 160 may output guiding information for guiding a handler movement direction in correspondence to the handler selection event. The control module 160 may perform resizing of the multi-window in real time according to movement of the handler. For example, the control module 160 may reduce or increase a size of at least one specific window by moving at least one of edges of the plurality of windows related to the handler in correspondence to the movement of the handler. The control module 160 may reduce or increase a size of at least one other window in correspondence to the reduction or increase of the size of the specific window. According to an embodiment, the control module 160 may adjust focus if the specific window is resized to a specified size or greater in a process of controlling display of the multi-window. For example, if an unfocused window is resized to the specified size or greater, the control module 160 may control so that the resized window is focused. If the focused window is resized to the specified size or smaller, the focus of the corresponding window may be released. The control module 160 may control a process of at least one selected from an input event reception standby state according to the focusing process, an audio signal output process, communication channel formation, and a communication module activation state.

According to various embodiments, when an operation of touching the handler occurs, the control module 160 may transit a display state of the multi-window to a multi-window state of a predefined ratio. For example, when the touch event (such as a double tap event, pinch zoom event, or long touch event) predefined on the touch panel on which the handler is disposed occurs, the control module 160 may equally divide the display module 140 and dispose the multi-window on the equally divided areas. At this point, the control module 160 may control so that a window focused before touching the handler is maintained as the focused state. Alternatively, the control module 160 may control so that a specific window is focused according to a predefined scheme.

When the event occurred in operation 307 is not the handler related event, the control module 160 may confirm whether the corresponding event is a switching event in operation 311. The switching event may be an event that changes a specific window position and another window position. For example, the switching event may be an event for moving the specific window for such as a drag event, sweep event, or flick event to another position on the display module 140. Furthermore, in an embodiment, the switching event is not limited to a kind of the above-described event. For example, a pinch zoom event for selecting a plurality of windows or an event for sequentially selecting a different window from the specific window may be the switching event. According to various embodiments, the control module 160 may support to create a window switching event through various schemes providing a menu when selecting the specific window or providing a state where another window to be changed may be designated when selecting the specific window.

When the window switching event occurs in operation 311, the control module 160 may perform a window switching process in operation 313. According to an embodiment, if a long touch event (a holding touch event maintained for a certain time or longer on an area where a specific window is disposed) occurs in relation to the specific window among the multi-window, the control module 160 may designate the corresponding window as a state capable of switching. In addition, the control module 160 may change the designated window position according to a drag event occurring after the long touch event. For example, the control module 160 may control a position change of the designated window and a window at least a portion of which is designated overlaps or that a certain portion thereof overlaps, according to a drag event direction and a moving distance.

When the switching event does not occur in operation 311, the control module 160 may process an operation according to the corresponding event in operation 315. For example, the control module 160 may process functions related to a corresponding event for an event occurring on a focused specific window. Alternatively, in case of an event requesting a focus change for the specific window, the control module 160 may perform a focus change according to the corresponding event.

The control module 160 may confirm whether an event related to a function completion occurs in operation 317. When the event related to the function completion occurs, the control module 160 may remove the multi-widows from the display module 140. In this process, the control module 160 may terminate a function related to the removed windows or transit to a standby state (or idle state). When the event related to function completion does not occur, the control module 160 may support to proceed before operation 305 and re-perform thereafter processes.

According to various embodiments, the multi-window control method according to an embodiment may include a process of displaying a plurality of windows, a process of changing a size of any one specific window among the plurality of windows in correspondence to an event occurrence, and a process of altering a focus that performs a function related to the specific window if the size of the specific window is extended to a specified size or greater.

According to various embodiments, the changing operation may include at least one operation selected from an operation of reducing a size of another window in correspondence of size extension of the specific window, an operation of releasing the altered focus if sizes of the other windows are reduced to the specified size or smaller, an operation of transitioning input state related to size-reduced windows to a deactivation state, if the sizes of the other windows are reduced to the specified size or smaller, and an operation of changing display effects of size-reduced windows, if the sizes of the other windows are reduced to the specified size or smaller.

According to various embodiments, the method may further include an operation of receiving an event related to the size reduced windows, an operation of extending, to the specified size, a window designated by the window related event, and an operation of altering a focus to the designated window.

According to various embodiments, the method may further include an operation of outputting a handler controlling to resize the windows to a boundary area where the plurality of windows are disposed.

According to various embodiments, the changing operation may further include an operation of resizing the specific window in correspondence to movement of the handler.

According to various embodiments, the method may further include an operation of receiving a handler touch event, an operation of resizing the plurality of windows in a predefined ratio and disposing them. The method may further include an operation of maintaining focus of the specific window.

According to various embodiments, the method may include an operation of receiving a handler movement event, an operation of extending a size reduced window in correspondence to the handler movement event, and an operation of changing the focus if the extended window is extended greater than a specified size.

According to various embodiments, the method may further include an operation of outputting guiding information instructing a specified size of a window satisfying the focus alteration.

According to various embodiments, the method may further include an operation of disposing a menu item related to the specific window on an area adjacent to a boundary area of the windows, an operation of receiving a window switching event, an operation of moving the specific window to a position where another window has been disposed in correspondence to the window switching event, an operation of moving the menu item with the specific window and disposing the menu item on the area adjacent to the boundary area of the windows.

Figure 4:
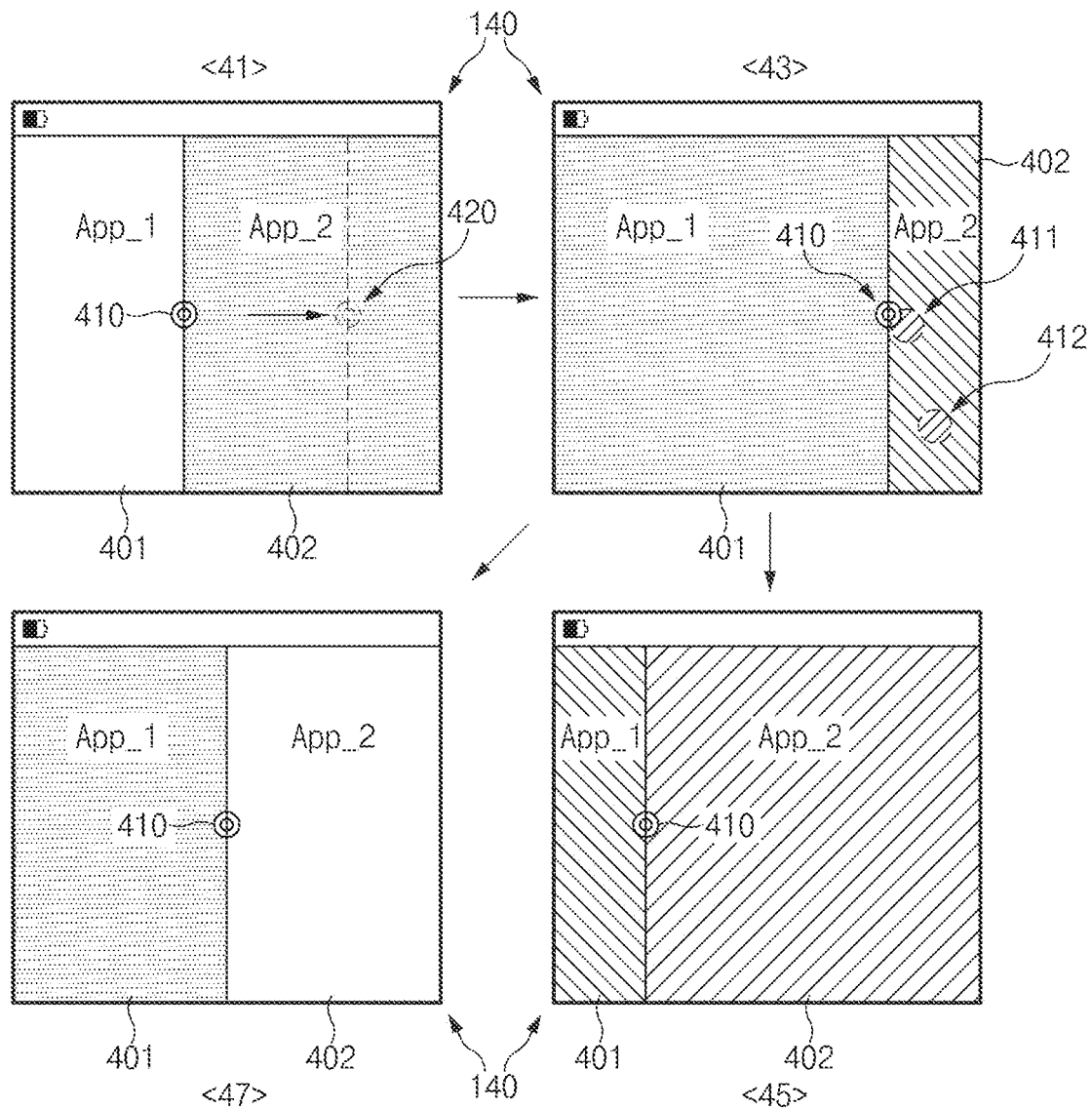
FIG. 4 illustrates a double window operation of multi-window according to an embodiment of the present disclosure.

FIG. 4 illustrates a double (dual) window operation of the multi-window according to an embodiment of the present disclosure.

Referring to FIG. 4, the display module 140 of the electronic device 100 may output multi-window including windows 401 and 402 as shown in a screen 41. The windows 401 and 402 may be disposed at certain areas divided from an entire screen of the display module 140. One edge of the window 401, for example, a right edge and a left edge of the window 402 may face each other. The display module 140 may output a handler 410 between the windows 401 and 402. The handler 410 may be disposed at an area where the windows 401 and 402 face each other. Here, the window 402 may be in a state of being focused. A specific touch event or a specific menu selection may occur to allow the window 402 to be focused. Alternatively, in an operation where the windows 401 and 402 are output on the display module 140, the window 402 may alter a focus by default. Alternatively, when the window 402 is output and multi-window is configured in a state where the window 401 is output in full screen of the display module 140, the window 402 output later in time may be automatically focused.

When receiving an event for selecting the handler 410 output on the display module 140, for example, a touch event occurring on a position at which the handler 410 is disposed, the control module 160 may output the guiding information 420 as shown. At this point, the guiding information 420 may be information for instructing a window size to be had in order for the window 401 to be automatically focused. For example, as in the screen 43, the size of the window 401 may be extended to an area instructed by the guiding information 420 by moving the handler 410. The control module 160 may be automatically focused if the size of the window 401 is extended to a specified size or greater. The display module 140 may reduce the size of the window 402 in correspondence to the size extension of the window 401. The control module 160 may release the focus of the corresponding window as shown, if the window 402 is reduced to a specified size or smaller. If the window 402 is reduced to the specified size or smaller, the control module 160 may process to have an input deactivation state. The input deactivation state may be a state where a specific touch event occurring on a window having the specified size or smaller is neglected.

In a state of the screen 43, when a predefined specific event 412 occurs, the control module 160 may change the multi-window environment as in a screen 45. For example, when a double tap event 412 occurs on the window 402 reduced to the specified size or smaller, the control module 160 may resize the window 402 to have a certain size or greater on the display module 140. For example, the control module 160 may control so that the window 402 has a greater area than the window 401. Alternatively, the control module 160 may control so that the window 402 is to be displayed in full screen. In this process, the control module 160 may control so that the window 402 is focused. The control module 160 may control so that an input (e.g., a touch input) to the window 401 becomes a deactivation state.

When a specific event 411 occurs which is predefined in a screen state 43, the control module 160 may control a multi-window change as in screen 47. For example, when a double tap event 411 occurs on a position at which the handler 410 is disposed, the control module 160 may control so that the windows 401 and 402 have the same display size on the display module 140. In this process, the control module 160 may control the window 401 so as to be focused. Although the specific events 411 and 412 are described as double tap events, various embodiments are not limited thereto. For example, the specific event may include various events such as a tap event, long touch event, and pinch zoom event.

The control module 160 may change a display effect according to a focus change. For example, the control module 160 may display borders of the focused window brighter than before or other windows. Alternatively, the control module 160 may change border color or shape of the focused window. Alternatively, the control module 160 may control so that a screen element enabling to recognize the focus is output on the border of the focused window.

In the above description, the specific event is exemplified as a double tap, but the present disclosure is not limited thereto. For example, the double tap event may be replaced with a pinch zoom event, a tap event touching multi-points, a swipe or sweep event. In addition, the windows 401 and 402 are transitioned to a state where a screen is equally divided and displayed according to the specific event occurs, the present disclosure is not limited thereto. For example, when the specific event occurs, the control module 160 may return to a state rightly before changed to screen 43, for example, a state 41.

Figure 5:
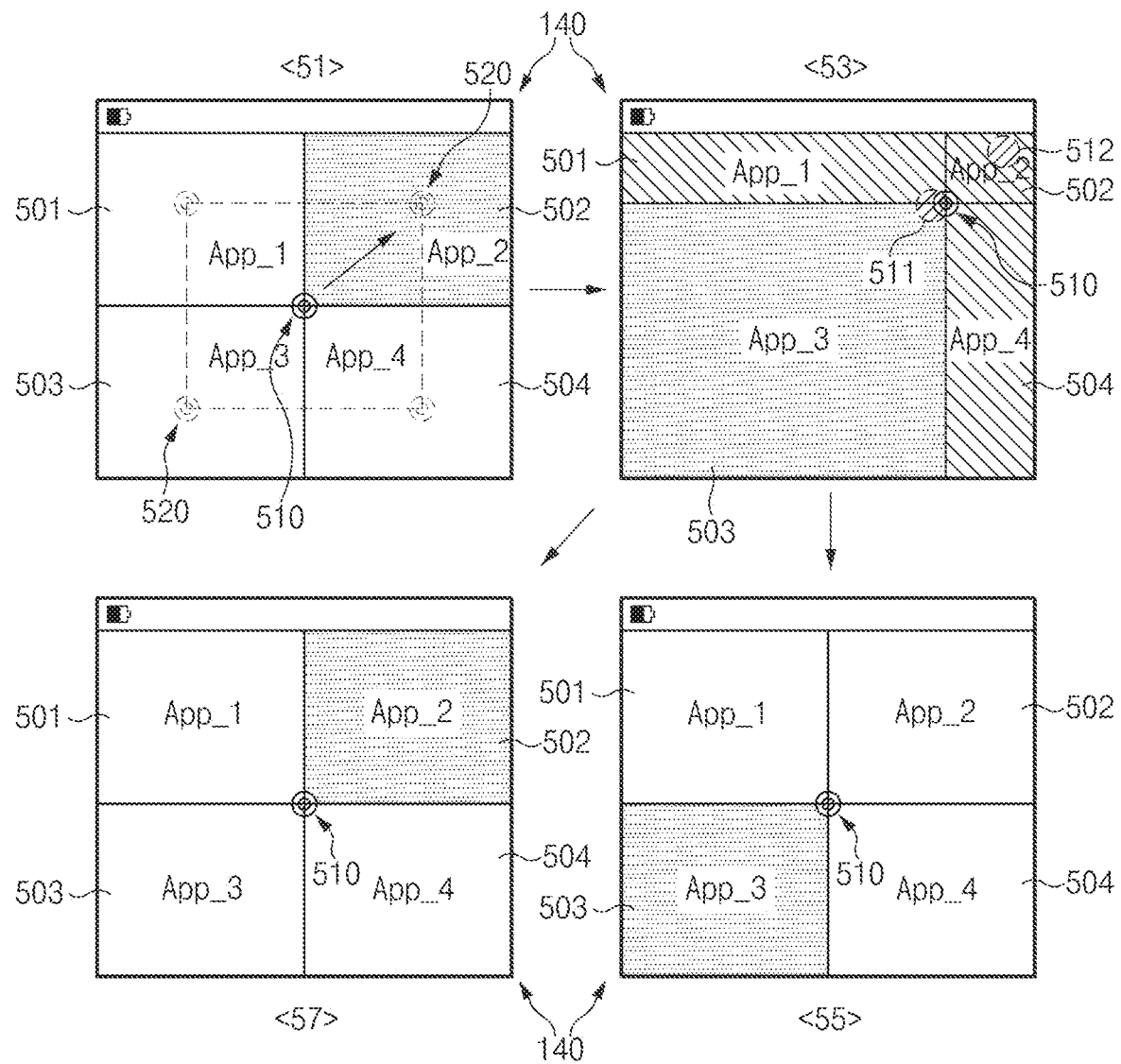
FIG. 5 illustrates a quad window operation of multi-window according to an embodiment of the present disclosure.

FIG. 5 illustrates a quad window operation of multi-window according to an embodiment of the present disclosure.

Referring to FIG. 5, the display module 140 may output four windows 501, 502, 503, and 504. The four windows 501, 502, 503, and 504 may be respectively disposed on certain areas of the equally divided display module 140 as in a screen 51. The display module 140 may output a handler 510 at a certain point at which the four windows 501, 502, 503, and 504 are disposed. According to an embodiment, the handler 510 may be disposed at a point where all the windows 501, 502, 503, and 504 are simultaneously connected. The electronic device 100 outputting the four windows 501, 502, 503, and 504 may alter a focus to the window 502 according to an input event or specified schedule information. The focus altered window 502 may have a screen activation state. The electronic device 100 may output an image signal related to the window 502 on an area of the window 502. The electronic device 100 may output an audio signal related to the window 502 through the multimedia module 130. When a communication module related to the window 502 is present, the electronic device 100 may control so that the corresponding communication module has an activation state. When the handler 510 is selected for resizing a specific window, the display module 140 may output guiding information 520 as shown in a screen. The guiding information may be displayed across at least a portion of the windows 501, 502, 503, and 504. The guiding information may be information instructing a minimum size to be changed in relation to focus alteration of the specific window.

A touch event related to movement of the handler 510 may occur. In addition, the handler 510 may be moved to a point of the guiding information 520 at a position where the window 502 is disposed as shown in a screen 53. In correspondence to this, the window 503 may be extended to a specified size or greater. The control module 160 may automatically alter a focus to the window 503 having the specified size or greater. The windows 501, 502, and 504 may be reduced to a specified size or smaller. The control module 160 may change the windows 501, 502, and 504 to an input deactivation state. In this process, the control module 160 may change display effects of the windows 501, 502, and 505 having the specified size or smaller. For example, the control module 160 may inverse color of or apply a shadow effect to at least one of the windows 501, 502, and 504 having the specified size or smaller.

In a screen state 53, a predefined handler related event 511 may occur. For example, in relation to the handler 510, a double tap event for touching the handler 510 twice may occur. When the predefined handler related event occurs, the control module 160 may control so that the windows 501, 502, 503, and 504 are displayed in a size of a certain predefined ratio. For example, the control module 160 may control so that the windows 501, 502, 503, and 504 are equally displayed as in a screen 55. According to various embodiments, the control module 160 may control so that the windows 501, 502, 503, and 504 are output in unequal sizes on the display module 140. Alternatively, the control module 160 may return to a screen state right before the screen state 53. According to one a embodiment, the control module 160 may control so that a specific window 503 remains focused just like the same state before the handler related event 511 occurs.

According to various embodiments, in relation to a window having a specified size or smaller, a predefined window related event 512 may occur. For example, a long touch event or a double tap event 512 may occur on the window 502. When the specified window related event 512 occurs, the control module 160 may dispose the windows 501, 502, 503, and 504 so as to have sizes of a predefined ratio. In this process, the control module 160 may control so that the window 502 corresponding to the window related event 512 is focused. Accordingly the control module 160 may release the focus of the window 503.

According to various embodiments, at least one of equally divided windows 501, 502, 503 and 504 may have an input activation state. For example, the control module 160 may alter the focus to the window 502 on a screen 57, but touch events occurring on the windows 501, 503 and 504 may be normally collected and processed. Accordingly, when a touch event occurs which is for selecting a specific object disposed on the window 501, the control module 160 may process the touch event occurring on the window 501. At this point, the control module 160 may control so that the window 501 has focus altered to the window 502. According to an embodiment, the control module 160 may output an audio signal related to the window 502, limit the audio signal related to the window 502 when a touch event occurs on the window 501, and then output an audio signal related to the window 501. Here, the window 503 whose focus is released may recognize a touch event occurring the corresponding window as a valid event like other windows, and have an input activation state capable of function-processing according to the corresponding event.

Furthermore, in the screen state 53, the windows 501, 502, and 504 may have an input deactivation state. In addition, until when a predefined specific touch event occurs, or a specific menu selection or a specified window size is obtained, the windows 501, 502, and 504 having a specified size or smaller may maintain the input deactivation state.

Figure 6:
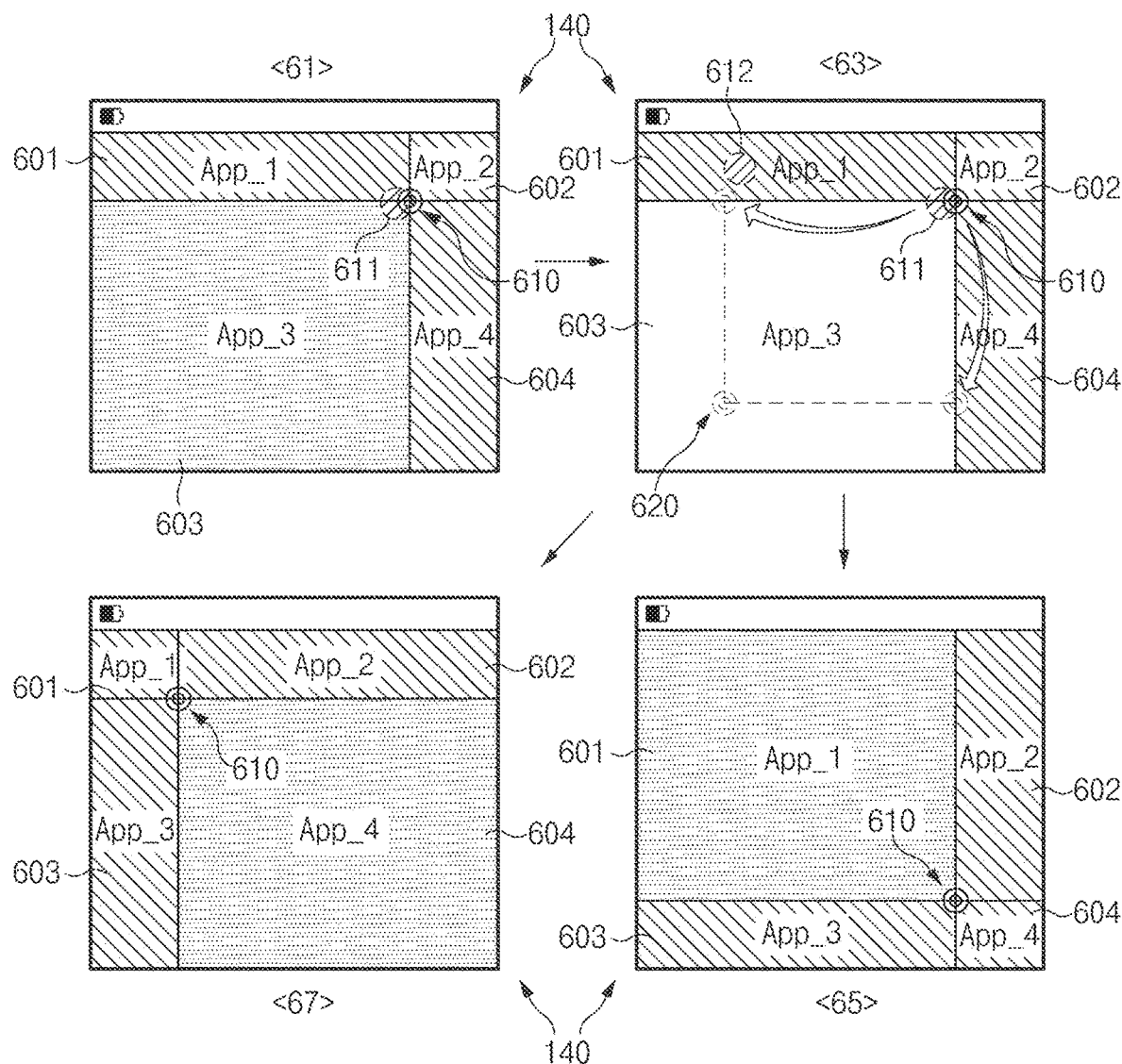
FIG. 6 illustrates another quad window operation of multi-window according to an embodiment of the present disclosure.

FIG. 6 illustrates a quad window operation of multi-window according to an embodiment of the present disclosure.

Referring to FIG. 6, the display module 140 may display a window 603 that is focused and windows 601, 602, and 604 having specified size or smaller as in a screen 61. The display module 140 may output a handler 610 at a point where corners of all the windows 601, 602, 603, and 604 are connected. The handler 610 may support to resize all the windows 601, 602, 603, and 604.

When an event 611 related to the handler 610, for example, an event 611 for long-touching the handler 610 in relation to the handler 610, the control module 160 may output guiding information 620 as in a screen 63. The guiding information 620 may instruct a size to be had in order for any one of all the windows 601, 602, 603, and 604 to be focused.

In the screen 63, an event for extending a size of the window 601 may occur. For example, a window related event 612 determined on an area where the window 601 is disposed occurs, or the handler 610 may be moved to a position allowing the window 601 to be extended in succession to the long touch event 611. According to an embodiment, when the handler 610 is moved downward, the size of the window 601 may be extended as in a screen 65. The display module 140 may output disposition of windows that the size of the window 601 is extended as in the screen 65. If the window 601 is extended to a specified size or greater, the control module 160 may control so that the window 601 is focused as in the screen 65. As the window is extended to a certain size, the sizes of the windows 602, 603, and 604 may be reduced to the specified size or smaller. The control module may control so that the windows 602, 603, and 604 having the specified size or smaller are in the input deactivation state. At this point, the control module 160 may change display effects of the windows 602, 603, and 604 having the specified size or smaller as shown.

In the screen 63, an event for extending the size of the window 604 may occur. For example, the handler 610 may be moved in a left direction of the screen, which is a direction that the window 604 is extended according to the guiding information 620, or a specific designated touch event may occur on an area on which the window is disposed. The control module 160 may extend the size of the window 604 as shown in the screen 67 according to the occurred event. The control module 160 may control so that the window 604 is focused at the time if the size thereof is changed to a specified size or greater. The control module 160 may control so that the windows 601, 602, and 603 having a specified size or smaller are in the input deactivation state.

Figure 7:
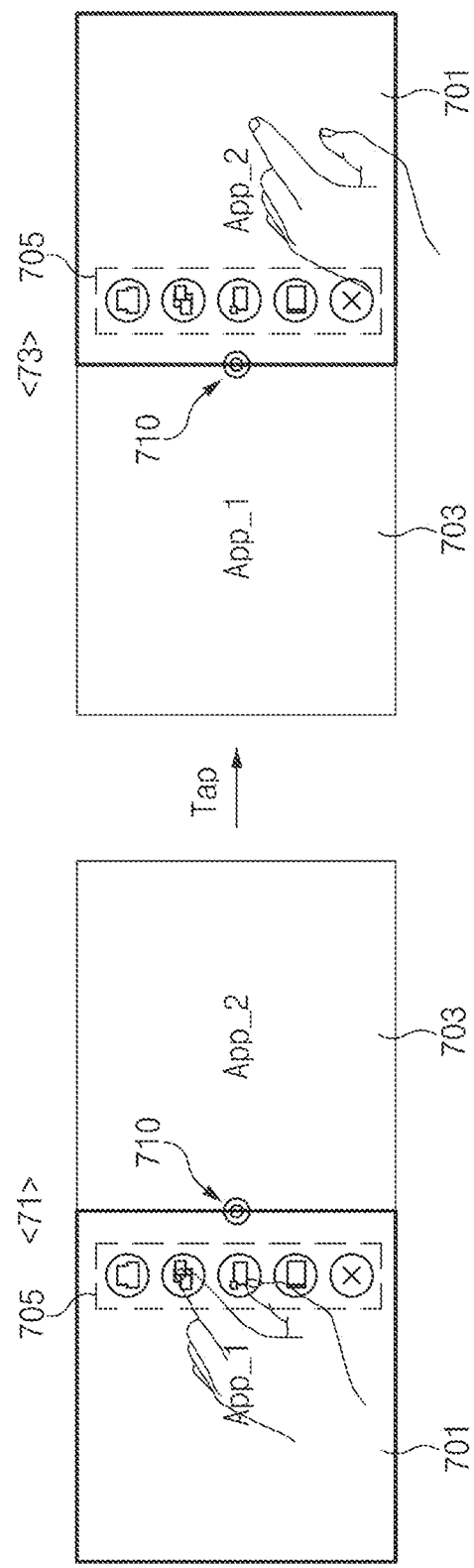
FIG. 7 illustrates a window switching operation between double windows of multi-window according to an embodiment of the present disclosure.

FIG. 7 illustrates window switching operation of double windows of multi-window according to an embodiment of the present disclosure.

Referring to FIG. 7, the display module 140 may display windows 701 and 703 as in a screen 71. A handler 710 may be output between the windows 701 and 703. The control module 160 may output a menu item 705 on the window 701 according to occurrence of an input event or a touch event. The menu item 705 may be disposed on a boundary area between the windows 701 and 703. For example, the menu item 705 may be disposed on an area of the window 701, which is adjacent to an area faced the windows 701 and 703. Here, the menu item may be a menu item related to a currently focused window. Accordingly, the menu item output on the display module 140 may be a menu item related a window focused at the time when an event related to the handler 710 occurs or an event related to a menu item call occurs.

The menu item 705 may include a window switching item. When the window switching item is selected, the windows 701 and 703 may be in a window switching standby state. According to occurrence of an event that moves the window 701, the control module 160 may move the window 701 to a position at which the window is disposed 703 as shown in a screen 73. In correspondence to this, the control module 160 may move the window 703 to a position at which the window 703 is disposed. The control module 160 may control so that, in the window switching operation, the menu item 705 is moved and output on the window 701. In this process, the control module 160 may be disposed at a position adjacent to the boundary area of the windows 703 and 701 as shown in the screen 73.

According to various embodiments, the control module 160 may recognize an event for long-touching the window 701 as the window switching event. Accordingly, when the long touch event occurs on the window 701, the control module 160 may change the window 701 to a state where switching is enabled. The control module 160 may swap the position of the window 701 with the position of the window 703 in correspondence to occurrence of a drag event.

Figure 8:
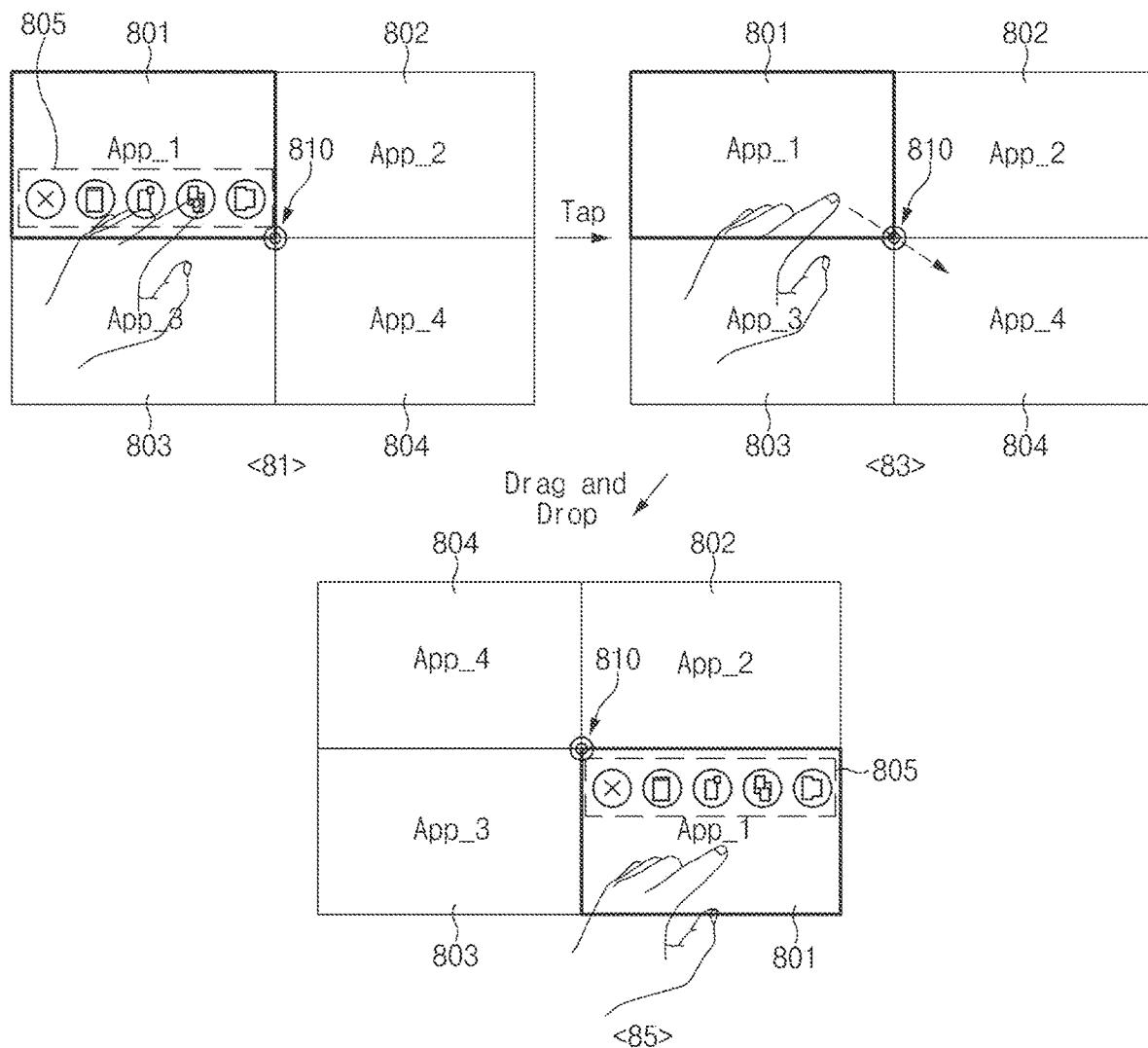
FIG. 8 illustrates a window switching operation among quad windows of multi-window according to an embodiment of the present disclosure.

FIG. 8 illustrates a window switching operation of quad windows of multi-window according to an embodiment of the present disclosure.

Referring to FIG. 8, the display module 140 may output windows 801, 802, 803, and 804 in correspondence to a multi-window output request as shown in a screen 81. The display module 140 may output a handler 810 to a boundary area of the windows 801, 802, 803, and 804. For example, the display module 140 may output the handler 810 at a position at which vertexes of the windows 801, 802, 803, and 804 are connected to each other. The control module 160 may alter a focus to a specific window, for example, the window 801 among the windows 801, 802, 803, and 804.

The control module 160 may output a menu item 805 on the window 801 in correspondence to an event occurrence or by default. Alternatively, the control module 160 may output a menu item related to a specific window in correspondence to an event occurrence related to manipulation of the handler 810. For example, the control module 160 may output a menu item related to a currently focused window or a menu item related to a window at a predefined specific position.

The menu item 805 may be disposed on a boundary area between the window 801 and another window. For example, the menu item 805 may be disposed at a position adjacent to a boundary area between the window 801 and the window 803. The menu item 805 may include a window switching item. When the window switching item among the menu item 805 is selected, the control module 160 may change the window 801 in a position movable state.

As in the screen 83, an event for moving the window 801 to a position at which the window 804 is disposed may occur. The control module 160 may move the window 801 to the position at which the window 804 is disposed in correspondence to occurrence of the corresponding event and moves the window 804 to a position at which the window 801 is disposed. In this process, the control module 160 may move the menu item 805 together. In addition, the menu item 805 may be automatically disposed on an area adjacent to a boundary area between the window 801 and another window. In a screen 85, the menu item 805 may be disposed on an area adjacent to a boundary area between the window 801 and window 802.

As described above, double windows and quad windows are exemplified as the multi-window, but the present disclosure is not limited thereto. For example, according to various embodiments, the multi-window may include various numbers of windows such as 3, 5, 6, 8, and 9. Accordingly, a division line for dividing the multi-window may equally or unequally divide the display module 140, and be included in plurality. In addition, the division line for dividing the multi-window may include various shapes such as a curved line, a spiral line, and a free curved line. The electronic device 100 according to an embodiment may control so that a window having a specific size or greater among the multi-window divided with various division lines is focused. Here, the electronic device 100 may control so that some, for example, 2 of a plurality of windows are focused. In this process, the electronic device 100 may process a plurality of audio sources and accordingly audio signals related to the plurality of windows may be compositely output.

According to various embodiments, the control module 160 of the electronic device 100 may include a bus and at least one process. Here the process may include, for example, at least one of the process module and the collection module described in relation to the electronic device 100. Alternatively, the process modules included in the window processing module 163 may be implemented with at least one processor.

The bus may be a circuit connecting the elements (e.g., a processor, storage module, input module, display module and communication module) to each other and delivering communication (e.g., a control message) between the elements.

The processor may receive commands from elements included the electronic devices through the bus, interpret the received commands, and perform operation or data process according to the interpreted commands. At this point, the processor controls so that at least one application stored in the storage module 150 is executed and a service based on the corresponding application is provided.

In addition, the processor may include one or more Application Processors (APs) or one or more Communication Processors (CPs). Here, the AP or CP may be included in the processor or included in different IC packages respectively. The AP may drive an operating system and an application program, control a plurality of hardware or software elements connected to the AP, and perform various processes and operations on data including multimedia data. Here, the AP may be implemented with System on Chip (SoC). In addition, the CP may discriminate and authenticate a terminal in a communication network by using a subscriber identification module (e.g., a SIM card). At this point, the CP may provide services including a voice call, a video call, a text message or packet data. In addition, the CP may control data transmission or reception of the communication module 110. The AP or CP may load, on a volatile memory, commands or data received from at least one of nonvolatile memories or other elements respectively connected thereto and process them. Furthermore, the AP or CP may store, in the nonvolatile memories, data received from or created by at least one of other elements. The CP may manage data links in communication between other electronic devices connected to an electronic device including hardware through a network and convert a communication protocol. Here, the CP may be implemented with a SoC. Additionally, the processor may further include a Graphic Processing Unit (GPU).

Furthermore, according to a convergence trend of digital devices, although modifications are various may not be enumerated, the electronic device 100 may further include components that are not mentioned above such as an acceleration sensor, a gyro sensor, a GPS module, a Near Field Communication (NFC) module, a vibration motor, or an accessory. In addition, the electronic device 100 may have a form such that specific components are excluded from the above described configuration or replaced with other components according to a provision type.

According to a multi-window control method and an electronic device supporting the same, various embodiments may minimize multi-window manipulation and support to enable proper function operations.

While the present disclosure has been shown and described with reference to various embodiments thereof, it will be understood by those of ordinary skill in the art that various changes in form and details may be made therein without departing from the spirit and scope of the present disclosure as defined by the appended claims and their equivalents.

What is claimed is:

1. An electronic device comprising:
   a touch display; and
   at least one processor configured to cause the electronic device to at least:
      provide a split screen mode in which a first window associated with a first audio signal and a second window associated with a second audio signal are displayed on the touch display,
      output the second audio signal while a focus is on the second window,
      receive a first user input to change a size of the first window,
      increase a size of the first window according to the first user input,
      decrease a size of the second window in correspondence with the size increase of the first window, and
      automatically change the focus from the second window to the first window in response to the size of the first window increased to larger than a specified size, and
      when the focus is changed from the second window to the first window, automatically output the first audio signal.

2. The electronic device of claim 1, wherein, when the size of the first window is increased to larger than a specified size, the at least one processor is further configured to stop outputting the second audio signal.

3. The electronic device of claim 1, wherein, when the at least one processor changes the focus from the second window to the first window, the at least one processor is further configured to stop outputting the second audio signal.

4. The electronic device of claim 1, wherein the at least one processor is further configured to switch a position of the first window with a position of the second window in response to an additional user input.

5. The electronic device of claim 1, wherein the at least one processor is further configured to convert the first window and the second window in a vertical or horizontal direction in response to another user input.

6. The electronic device of claim 1,
   wherein the at least one processor is further configured to:
      receive a second user input on a boundary area, and
      display a menu on the touch display in response to the received second user input on the boundary area, and
   wherein the menu displays information that includes instructions to select the first window or the second window, remove the first window or the second window, and change the size of the first window or the second window in relation to the second window or the first window respectively.

7. A method of controlling a multi-window in an electronic device, the method comprising:
   providing a split screen mode in which a first window associated with a first audio signal and a second window associated with a second audio signal are displayed on a touch display;

outputting the second audio signal while a focus is on the second window;
receiving a first user input to change a size of the first window;
increasing a size of the first window according to the first user input;
decreasing a size of the second window in correspondence with the size increase of the first window;
automatically changing the focus from the second window to the first window in response to the size of the first window increased to larger than a specified size; and
when the focus is changed from the second window to the first window, automatically outputting the first audio signal.

8. The method of claim 7, wherein when the size of the first window is increased to larger than a specified size.

9. The method of claim 7, wherein when the focus is changed from the second window to the first window, the outputting the second audio signal is stopped.

10. The method of claim 7, wherein the method further comprises switching a position of the first window with a position of the second window in response to an additional user input.

11. The method of claim 7, wherein the method further comprises converting the first window and the second window in a vertical or horizontal direction in response to another user input.

12. The method of claim 7, wherein the method further comprises:
receiving a second user input on a boundary area; and
displaying a menu on the touch display in response to the received second user input on the boundary area,
wherein the menu displays information that includes instructions to select the first window or the second window, remove the first window or the second window, and change the size of the first window or the second window in relation to the second window or the first window respectively.

13. An electronic device comprising:
a touch display; and
at least one processor configured to cause the electronic device to at least:
provide a split screen mode in which a first window associated with a first audio signal and a second window associated with a second audio signal are displayed on the touch display,
receive a first user input to change a size of the first window,
increase a size of the first window in response to the first user input,
decrease a size of the second window in correspondence with the size increase of the first window,
automatically output the first audio signal in response to the size of the first window increased to larger than a specified size, and
automatically display the second window by decreasing an amount of brightness of the second window in response to decreased size of the second window.

14. The electronic device of claim 13, wherein the at least one processor is further configured to switch a position of the first window with a position of the second window in response to a second user input.

15. The electronic device of claim 13, wherein the at least one processor is further configured to convert the first window and the second window in a vertical or horizontal direction in response to third user input.

16. The electronic device of claim 13,
wherein the at least one processor is further configured to:
receive a fourth user input on a boundary area, and
display a menu on the touch display in response to the received fourth user input on the boundary area, and
wherein the menu displays information that includes instructions to select the first window or the second window, remove the first window or the second window, and change the size of the first window or the second window in relation to the second window or the first window respectively.

17. The electronic device of claim 13, wherein, when the size of the first window is increased to larger than a specified size, the at least one processor is further configured to stop outputting the second audio signal as outputting the first audio signal.

18. The electronic device of claim 13, wherein, when the size of the first window is increased to larger than a specified size, the at least one processor is further configured to change a focus being on the second window to the first window.

* * * * *